United States Patent
Wesling et al.

(10) Patent No.: US 10,774,668 B2
(45) Date of Patent: Sep. 15, 2020

(54) INTERSAGE SEAL ASSEMBLY FOR COUNTER ROTATING TURBINE

(71) Applicant: General Electric Company, Schenectady, NY (US)

(72) Inventors: Richard Alan Wesling, Cincinnati, OH (US); Darek Tomasz Zatorski, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 15/709,642

(22) Filed: Sep. 20, 2017

(65) Prior Publication Data
US 2019/0085712 A1    Mar. 21, 2019

(51) Int. Cl.
| | |
|---|---|
| *F01D 11/12* | (2006.01) |
| *F02C 3/067* | (2006.01) |
| *F01D 5/03* | (2006.01) |
| *F01D 5/22* | (2006.01) |
| *F01D 11/14* | (2006.01) |
| *F01D 11/16* | (2006.01) |

(Continued)

(52) U.S. Cl.
CPC ............. *F01D 11/122* (2013.01); *F01D 5/03* (2013.01); *F01D 5/225* (2013.01); *F01D 11/001* (2013.01); *F01D 11/02* (2013.01); *F01D 11/08* (2013.01); *F01D 11/12* (2013.01); *F01D 11/14* (2013.01); *F01D 11/16* (2013.01); *F02C 3/067* (2013.01); *F02K 3/072* (2013.01); *F05D 2240/56* (2013.01); *F05D 2240/59* (2013.01)

(58) Field of Classification Search
CPC ........ F01D 11/00; F01D 11/001; F01D 11/02; F01D 11/22; F01D 1/18; F01D 1/20; F01D 1/24; F01D 1/26; F01D 11/005; F16J 15/447

USPC ............................................ 415/174.5, 173.7
See application file for complete search history.

(56) References Cited

U.S. PATENT DOCUMENTS

| | | | |
|---|---|---|---|
| 5,127,799 | A | 7/1992 | Berry |
| 5,197,281 | A | 3/1993 | Przytulski et al. |

(Continued)

FOREIGN PATENT DOCUMENTS

| | | |
|---|---|---|
| DE | 1526873 A1 | 3/1970 |
| EP | 1 653 045 A2 | 5/2006 |
| WO | 2013/150198 A1 | 10/2013 |

OTHER PUBLICATIONS

Extended European Search Report and Opinion issued in connection with corresponding EP Application No. 18194840.7 dated Dec. 20, 2018.

*Primary Examiner* — Kenneth J Hansen
*Assistant Examiner* — Maxime M Adjagbe
(74) *Attorney, Agent, or Firm* — Dority & Manning, P.A.

(57) ABSTRACT

The present disclosure is directed to a gas turbine engine including a turbine rotor assembly that includes a first turbine rotor and a second turbine rotor. The first turbine rotor includes an outer rotor and a plurality of outer rotors extended inwardly along a radial direction from the outer rotor. The second turbine rotor includes an inner rotor and a plurality of inner rotor airfoils extended outwardly along the radial direction from the inner rotor. The plurality of outer rotor airfoils and inner rotor airfoils are disposed in alternating arrangement along a longitudinal direction. One or more rotating seal interfaces are defined between the first turbine rotor and the second turbine rotor.

20 Claims, 7 Drawing Sheets

(51) Int. Cl.
F01D 11/08 (2006.01)
F01D 11/02 (2006.01)
F01D 11/00 (2006.01)
F02K 3/072 (2006.01)

(56) References Cited

U.S. PATENT DOCUMENTS

| | | |
|---|---|---|
| 5,967,746 A | 10/1999 | Hagi et al. |
| 6,220,814 B1 | 4/2001 | Brushwood et al. |
| 6,550,777 B2 | 4/2003 | Turnquist et al. |
| 6,732,502 B2 | 5/2004 | Seda et al. |
| 7,048,496 B2 * | 5/2006 | Proctor .................... F01D 1/26 415/115 |
| 7,909,335 B2 | 5/2011 | Turnquist et al. |
| 8,784,045 B2 | 7/2014 | Zoric et al. |
| 9,017,018 B2 | 4/2015 | Vest |
| 9,255,642 B2 * | 2/2016 | Bidkar ................... F16J 15/447 |
| 9,322,286 B2 * | 4/2016 | Digard Brou De Cuissart .......... F01D 9/041 |
| 9,534,608 B2 | 1/2017 | Gehlot et al. |
| 2006/0093468 A1 | 5/2006 | Orlando et al. |
| 2008/0056895 A1 | 3/2008 | Senoo |
| 2012/0301275 A1 | 11/2012 | Suciu et al. |
| 2013/0045091 A1* | 2/2013 | Della-Fera ............ F01D 11/122 415/174.4 |
| 2016/0115805 A1 | 4/2016 | Gibson et al. |

\* cited by examiner

INTERSAGE SEAL ASSEMBLY FOR COUNTER ROTATING TURBINE

FIELD

The present subject matter relates generally to gas turbine engines. More specifically, the subject matter relates to structures for mitigating deflection and gas leakage of interdigitated turbine rotor assemblies.

BACKGROUND

Conventional gas turbine engines generally include seal assemblies between a rotary component and a static component. During operation of the engine, the rotary component deflects (e.g., expands, contracts, etc.) as a function of radial, circumferential, and axial forces, thermal expansion/contraction, and pressure differentials. Seal assemblies are defined between rotary and static components to limit and control an amount of leakage or pressure loss between stages of the rotary component, or into the core flowpath or secondary flowpath, and to maintain desired pressure differentials. During operation of the engine, deflection of the rotary component is generally large relative to deflection of the static component, such as to enable considering the static component as non-deflected relative to the deflection of the rotary component.

However, interdigitated turbine rotor assemblies include rotary component to rotary component interfaces in which each rotary component experiences deflections different from the other rotary component. For example, an outer rotor assembly experience radial, circumferential, and axial forces different from an inner rotor assembly with which is interdigitated with the outer rotor assembly. As such, during operation of the engine, deflection of each rotary component is generally larger relative to conventional engines incorporating rotary-to-static seal assemblies. Therefore, leakages at rotary-to-rotary interfaces are generally large, such that performance and efficiency benefits of an interdigitated turbine arrangement may be substantially offset by leakages cross rotary-to-rotary interfaces.

As such, there is a need for structures for mitigating deflection and gas leakage across rotary-to-rotary component interfaces in interdigitated gas turbine engines.

BRIEF DESCRIPTION

Aspects and advantages of the invention will be set forth in part in the following description, or may be obvious from the description, or may be learned through practice of the invention.

The present disclosure is directed to a gas turbine engine including a turbine rotor assembly that includes a first turbine rotor and a second turbine rotor. The first turbine rotor includes an outer rotor and a plurality of outer rotors extended inwardly along a radial direction from the outer rotor. The second turbine rotor includes an inner rotor and a plurality of inner rotor airfoils extended outwardly along the radial direction from the inner rotor. The plurality of outer rotor airfoils and inner rotor airfoils are disposed in alternating arrangement along a longitudinal direction. One or more rotating seal interfaces are defined between the first turbine rotor and the second turbine rotor.

In one embodiment, the rotating seal interface is defined at an outer diameter of the plurality of inner rotor airfoils and at an inner diameter of the outer rotor.

In another embodiment, the rotating seal interface is defined at an inner diameter of the plurality of outer rotor airfoils and at an outer diameter of the inner rotor.

In various embodiments, the rotating seal interface includes a first platform coupled to an inner diameter of the plurality of outer rotor airfoils or an outer diameter of the inner rotor. The first platform is extended at least partially along a longitudinal direction and along a circumferential direction relative to an axial centerline. A spring assembly is coupled to the first platform. The spring assembly is disposed between the first platform and a radially adjacent turbine rotor. The spring assembly permits displacement at least along the radial direction toward the first platform. A second platform is coupled to the spring assembly. The second platform is coupled to the spring assembly radially opposite of the first platform such as to be radially inward or radially outward of the first platform. The second platform is extended at least partially along the longitudinal direction and along the circumferential direction relative to the axial centerline.

In one embodiment, the rotating seal interface further includes a third platform coupled to the outer diameter of the plurality of inner rotor airfoils or the inner diameter of the plurality of outer rotor airfoils. The third platform is disposed radially adjacent to the first platform on the opposing rotor of the turbine rotor assembly. The third platform is extended at least partially along the longitudinal direction and along the circumferential direction relative to the axial centerline.

In various embodiments, the rotating seal interface further defines one or more teeth extended along the radial direction toward the radially adjacent turbine rotor and extended along the circumferential direction relative to the axial centerline. The one or more teeth are in adjacent arrangement along the longitudinal direction. In one embodiment, the teeth are disposed on the second platform and extended generally along the radial direction toward the third platform. In another embodiment, the teeth are disposed on the third platform and extended generally along the radial direction toward the second platform. In yet another embodiment, the third platform further defines a rib disposed radially inward of the teeth, the rib defining a weight promoting deflection of the third platform along the radial direction.

In yet various embodiments, the third platform is extended along the longitudinal direction and cantilevered from a radial portion of the turbine rotor assembly. In one embodiment, a radius is defined between the third platform and the radial portion of the turbine rotor assembly, the radius promoting deflection of the third platform along the radial direction.

In another embodiment, the rotating seal interface defines a foil seal assembly together at the first turbine rotor and the second turbine rotor.

In still another embodiment, one or more of the first platform, the spring assembly, and the second platform are segmented along the circumferential direction, permitting substantially independent radial displacement of each segment relative to one another.

In still yet another embodiment, the second platform defines an abradable material at least on a diameter radially opposing the teeth disposed on the third platform.

In various embodiments, the outer rotor airfoils defines a first material defining a density of approximately 4.0 g/cm3 or less.

In one embodiment, the rotating seal interface includes a second platform coupled to an inner diameter of the outer rotor airfoils or an outer diameter of the inner rotor airfoils; and a third platform coupled to the opposing rotor of the turbine rotor assembly radially opposite of the second platform. The third platform defines one or more teeth extended along the radial direction toward the second platform and extended along the circumferential direction relative to the axial centerline. The one or more teeth are in adjacent arrangement along the longitudinal direction. The second platform defines an abradable material at least on a diameter radially opposing the third platform.

In various embodiments, the rotating seal interface defines a first platform extended along the radial direction and a second platform extended along the radial direction and adjacent along the longitudinal direction to the first platform. The first platform is defined at an inner diameter of the outer rotor airfoils or an outer diameter of the inner rotor airfoils. The second platform is defined at the opposing turbine rotor at the outer diameter of the inner rotor airfoils or at the inner diameter of the outer rotor airfoils.

In one embodiment, the second platform further defines a first wall and a second wall extended along the radial direction and separated along the longitudinal direction. A spring assembly is defined between the first wall and the second wall. The spring assembly permits displacement of the second platform relative to the first platform along the longitudinal direction between the first turbine rotor and the second turbine rotor.

In another embodiment, an axial wall is coupled to the first wall and the second wall and defined therebetween. A fluid passage is defined between the first platform, the second platform, and the axial wall.

In yet another embodiment, the first platform or the second platform defines a carbon seal surface longitudinally adjacent to the opposing platform. The carbon seal surface is defined circumferentially along the first platform or the second platform relative to the axial centerline.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
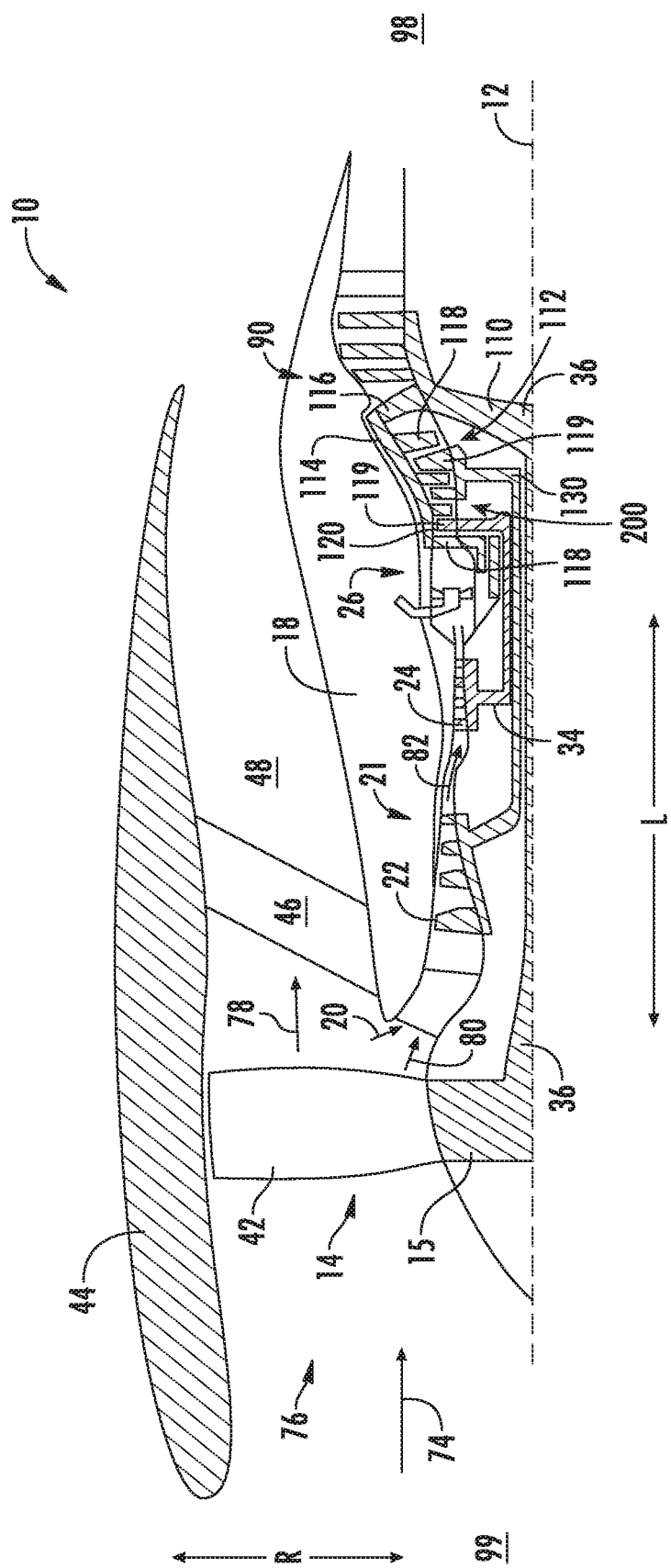
FIG. 1 is a schematic cross sectional view of an exemplary embodiment of a gas turbine engine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of structures for mitigating deflection and gas leakage across rotary-to-rotary component interfaces in interdigitated gas turbine engines are generally provided. The structures for mitigating flowpath leakage across a first turbine rotor interdigitated or counter-rotating with a second turbine rotor are generally provided that may mitigate deleterious effects of rotating-to-rotating interfaces in gas turbine engines. The various embodiments of a rotating seal interface and turbine rotor assembly generally shown and described herein may reduce radial or axial deflections, or minimize relative distances or gaps between a first turbine rotor that is at least partially independently rotatable relative to a second turbine rotor. As such, the various embodiments of the turbine rotor assembly and rotating seal interface shown and described herein enable utilization and realization of benefits of a counter-rotating turbine rotor assembly while mitigating deleterious effects due to rotating-to-rotating seal interfaces.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. Still further, although described below as a three-spool gas turbine engine, the present disclosure is also applicable to two-spool gas turbine engines. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). Generally, the engine 10 defines, in serial flow arrangement from the upstream end 99 to the downstream end 98, the fan assembly 14, the compressor section 21, the combustion section 26, and the turbine section 90. In the embodiment shown in FIG. 1, the compressor section 21 defines a high pressure (HP) compressor 24 and an intermediate pressure (IP) compressor 22. In other embodiments, the fan assembly 14 may further include or define one or more stages of a plurality of fan blades 42 that are coupled to and extend outwardly in the radial direction R from a fan rotor 15 and/or a low speed shaft 36. In various embodiments, multiple stages of the plurality of fan blades 42 coupled to the low speed shaft 36 may be referred to as a low pressure (LP) compressor.

An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

Figure 2:
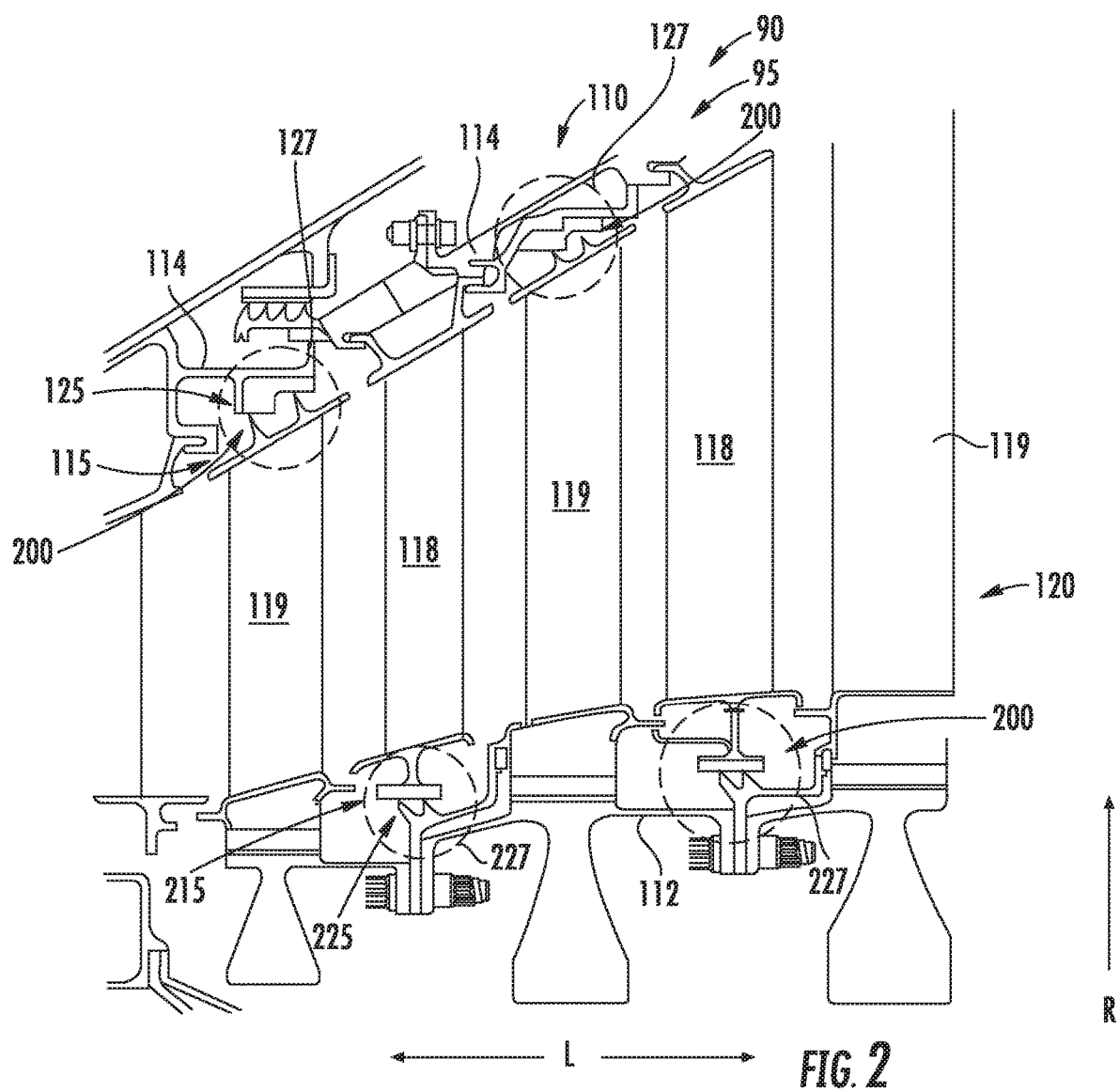
FIG. 2 is a cross sectional view of a portion of an exemplary embodiment of a turbine rotor assembly of the turbine section of the gas turbine engine shown in FIG. 1.

Referring now to FIG. 2, the turbine section 90 includes a turbine rotor assembly 95. The turbine rotor assembly 95 includes a first turbine rotor 110 in alternating arrangement along the longitudinal direction L with a second turbine rotor 120. The first turbine rotor 110 includes an outer rotor 114 surrounding the second turbine rotor 120. A plurality of outer rotor airfoils 118 extended inward along the radial direction R from the outer rotor 114. In various embodiments, the outer rotor 114 defines a drum or disk into which the plurality of outer rotor airfoils 118 are fixed. For example, the plurality of outer rotor airfoils 118 may be fixed to the outer rotor 114 via hangers, slots, dovetails, pins, mechanical fasteners (e.g., bolts, nuts, rivets, tie rods, etc.), or combinations thereof.

The second turbine rotor includes an inner rotor 112. A plurality of inner rotor airfoils 119 is extended outward along the radial direction R from the inner rotor 112. The inner rotor 112 may define a drum, disk, bladed disk (e.g., Blisk) or integrally bladed rotor (IBR). The plurality of inner rotor airfoils 119 may be fixed to the inner rotor 112 via hangers, slots, dovetails pins, mechanical fasteners, or combinations thereof. In various embodiments, the inner rotor 112 and inner rotor airfoils 119 may be defined substantially as a single, integral piece.

In various embodiments, the turbine rotor assembly 95 generally provided in FIG. 2 defines a counter-rotating low speed turbine rotor assembly. The first turbine rotor 110 and the second turbine rotor 120 may each be coupled to the low speed shaft 36. In one embodiment, the first turbine rotor 110 is coupled to the low speed shaft 36 and the second turbine rotor 120 is coupled to the low speed shaft 36 via a speed reduction assembly. The speed reduction assembly may include a gearbox, a gear assembly, or a hydraulic or pneumatic speed change assembly. The low speed shaft 36 is coupled at an opposing longitudinal end to the fan rotor 15 of the fan assembly 14.

In another embodiment, the second turbine rotor 120 is coupled to a high speed shaft 34 that is further coupled at an opposing longitudinal end to the HP compressor 24. In still various embodiments, the turbine section 90 may further include a third turbine rotor 130 coupled to a low pressure (LP) or intermediate pressure (IP) compressor 22 at an opposing longitudinal end of the engine 10 via a third shaft. In still yet various embodiments, the turbine rotor assembly 95 described herein may include the first turbine rotor 110 surrounding one or more of the aforementioned embodiments of the second turbine rotor 120, third turbine rotor 130, or both. In still various embodiments, the first turbine rotor 110 is in counter-rotating arrangement relative to the second turbine rotor 120, the third turbine rotor 130, or both.

The various embodiments of the turbine rotor assembly 95 generally define an at least partially independently rotatable first turbine rotor 110 relative to the second turbine rotor 120. For example, the first turbine rotor 110 may define a generally fixed or proportional speed relative to the second turbine rotor 120. As another example, the first turbine rotor 110 may be defined independently rotatable relative to the second turbine rotor 120 or third turbine rotor 130, or both.

Referring now to FIGS. 1-2, the turbine section 90 may include one or more rotating seal interfaces 200 defined between the first turbine rotor 110 and the second turbine rotor 120. The rotating seal interface 200 defines a rotating-to-rotating interface between the first turbine rotor 110 and the second turbine rotor 120. In various embodiments, the rotating seal interface 200 is defined at an outer diameter 115 of the plurality of inner rotor airfoils 119 and at an inner diameter 125 of the outer rotor 114, such as generally encircled as shown at 127. In still various embodiments, the rotating seal interface 200 is defined at an inner diameter 215 of the plurality of outer rotor airfoils 118 and at an outer diameter 225 of the inner rotor 112.

Figure 3:
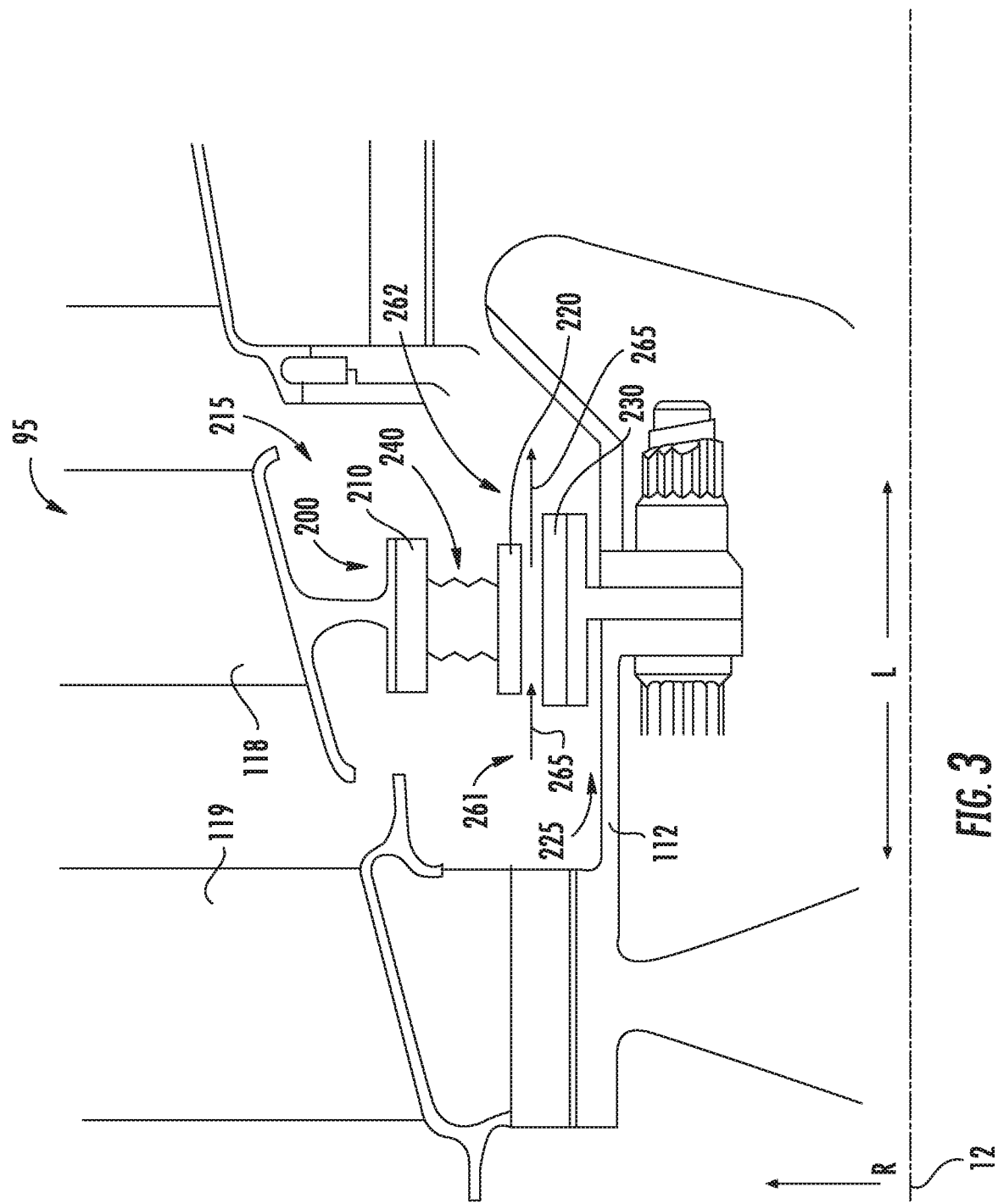
FIG. 3 is an exemplary embodiment of a rotating seal interface of the turbine rotor assembly generally provided in FIG. 2.

Referring now to FIG. 3, an exemplary embodiment of the rotating seal interface 200 is generally provided. The rotating seal interface 200 includes a first platform 210 coupled to the inner diameter 215 of the plurality of outer rotor airfoils 118 or the inner diameter 125 of the outer rotor 114. The first platform 210 is extended at least partially along the longitudinal direction L and along the circumferential direction C (FIG. 4) relative to the axial centerline 12. For example, the first platform 210 is extended at least substantially around the inner diameter 215 of the plurality of outer rotor airfoils 118 around the axial centerline 12. As another example, the first platform 210 defines a generally annular structure.

The rotating seal interface 200 further includes a spring assembly 240 coupled to the first platform 210. The spring assembly 240 is disposed between the first platform 210 and an adjacent turbine rotor along the radial direction R. For example, as generally provided in FIG. 3, the first platform 210 is coupled to the inner diameter 215 of the plurality of outer rotor airfoils 118 of the first turbine rotor 110. The radially adjacent turbine rotor relative to the first turbine rotor 110 is the second turbine rotor 120. More specifically, the first platform 210 and the spring assembly 240 are adjacent along the radial direction R to the outer diameter 225 of the inner rotor 112.

The rotating seal interface 200 further includes a second platform 220 coupled to the spring assembly 240. The second platform is coupled to the spring assembly 240 opposite along the radial direction R of the first platform 210. In the embodiment shown in FIG. 3, the second platform is disposed inward along the radial direction R of the first platform 210. The second platform 220 is extended at least partially along the longitudinal direction L and along the circumferential direction relative to the axial centerline 12. For example, the second platform 220 is extended at least substantially annularly inward of the inner diameter 215 of the plurality of outer rotor airfoils 118. Alternatively, the second platform 220 is extended at least substantially annularly outward of the outer diameter 225 of the inner rotor 112.

The spring assembly 240 permits displacement at least along the radial direction R. The spring assembly 240 enables deflection at least along the radial direction R of the second platform 220 coupled to the spring assembly 240. The spring assembly 240 generally includes a structure defining springing properties, such as to enable compression/tension or generally elastic movement along the radial direction R. Therefore, the spring assembly 240 may define a material enabling elastic deflection along the radial direction R. More specifically, the spring assembly 240 enables elastic deflection along the radial direction R in response to centrifugal forces and aerodynamic forces. For example, the spring assembly 240 enables deflection along the radial direction R due to radial forces from rotation of the outer rotor 114 and the outer rotor airfoils 118. As another example, the spring assembly 240 enables deflection along the radial direction R due to a controlled flow of fluid between the second platform 220 and the radially opposing turbine rotor (e.g., in FIG. 3, the inner rotor 112) from a first end 261 to a second end 262.

In various embodiments, the rotating seal interface 200 further includes a third platform 230 coupled to the inner diameter 125 of the outer rotor 114 or the outer diameter 225 of the inner rotor 112. The third platform 230 is disposed adjacent along the radial direction R to the second platform 220 on the opposing rotor of the turbine rotor assembly 95. For example, as generally provided in FIG. 3, the third platform 230 is disposed at the outer diameter 225 of the inner rotor 112 radially opposing the inner diameter 215 of the outer rotor airfoil 118. In other embodiments, the third platform 230 is disposed at the outer diameter 115 of the inner rotor airfoils 119 radially opposing the inner diameter 125 of the outer rotor 114. The third platform 230 is extended at least partially along the longitudinal direction L and along the circumferential direction relative to the axial centerline 12.

During operation of the engine 10, the turbine rotor assembly 95 generates a flow of fluid 265 from the first end 261 to the second end 262 between the second platform 220 and the third platform 230 of the rotating seal interface 200. The spring assembly 240 is configured to permit the flow of fluid 265 such as to define a cushion or buffer between the adjacent first turbine rotor 110 and second turbine rotor 120. Referring to the embodiment shown in FIG. 3, the cushion or buffer is defined between the second platform 220 coupled to the outer rotor airfoil 118 and the third platform 230 coupled to the inner rotor 112. In other embodiments, the cushion or buffer defined by the flow of fluid 265 is defined between the second platform 220 coupled to the outer rotor 114 and the third platform 230 coupled to the inner rotor airfoils 119. The spring assembly 240 is further configured to limit deflection along the radial direction R such as to minimize the amount of the flow of fluid 265 from the first end 261 to the second end 262.

It should be appreciated that although FIG. 3 generally depicts the rotating seal interface 200 coupled to the inner diameter 215 of the outer rotor airfoils 118 and the outer diameter 225 of the inner rotor 112, such as shown at area 227 in FIG. 2, the seal assembly 200 can further be disposed at the outer diameter 115 of the inner rotor airfoils 119 and the inner diameter 125 of the outer rotor 114, such as shown at area 127 in FIG. 2. Still further, in various embodiments, the rotating seal assembly 200 may dispose the first platform 210 on the inner diameter 215 of the outer rotor airfoils 118, such as generally provided in FIG. 3. In other embodiments, the first platform 210 may be disposed on the outer diameter 225 of the inner rotor 112. In still other embodiments, the first platform 210 may be disposed on the outer diameter 125 of the inner rotor airfoils 119 adjacent to the third platform 230 on the outer rotor 114.

Figure 4:
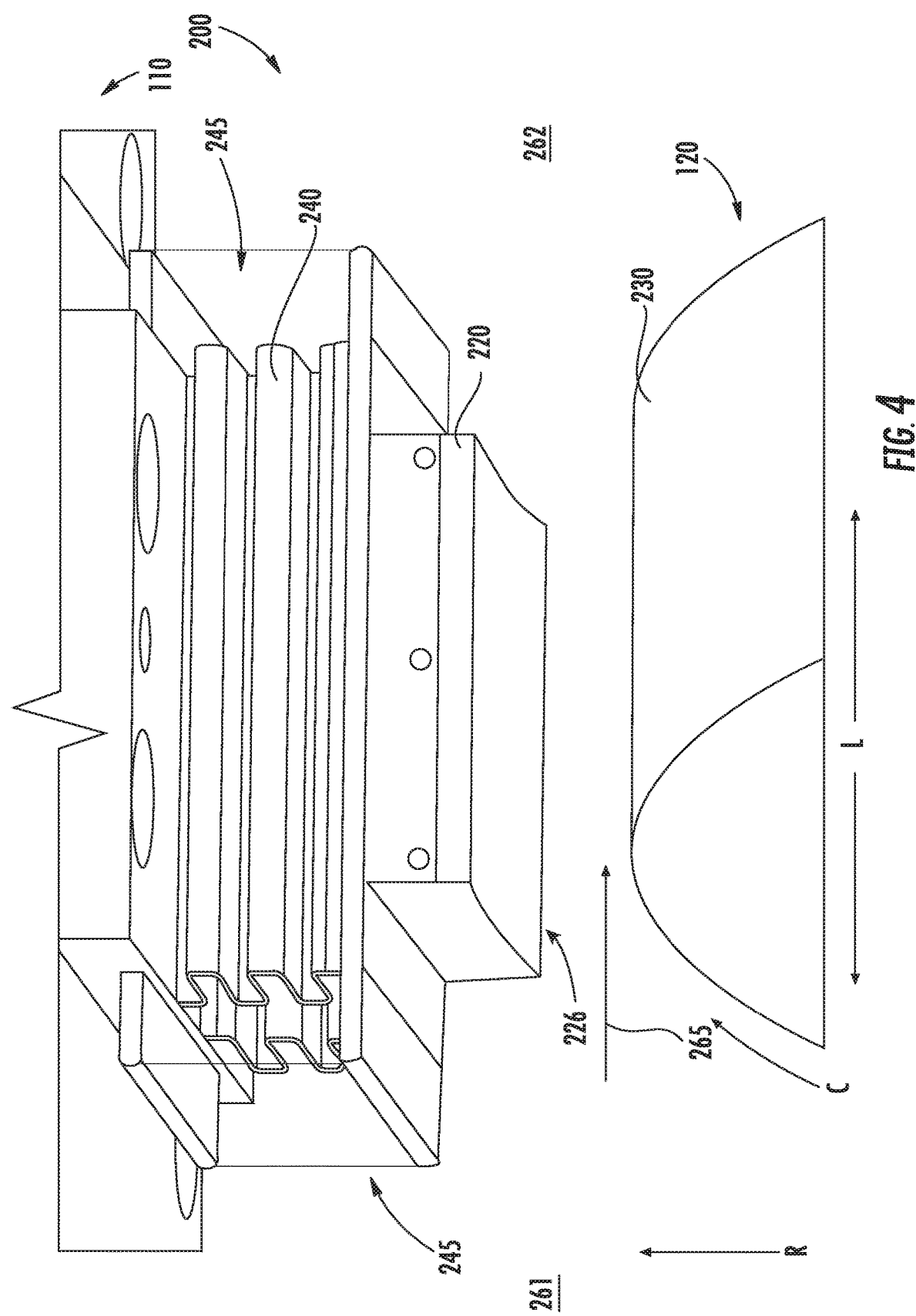
FIG. 4 is a perspective view of an exemplary embodiment of a rotating seal interface generally provided in FIG. 3.

Referring now to FIG. 4, a perspective view of an embodiment of the rotating seal interface 200 is generally provided. The rotating seal interface 200 shown in FIG. 4 may be configured substantially similarly as shown and provided in regard to FIG. 3. In the embodiment provided in FIG. 4, the rotating seal interface 200 further defines a sealing wall 245 at one or more ends longitudinally adjacent to the spring assembly 240. The sealing wall 245 is extended from the first platform 210 to the second platform 220. The sealing wall 245 may prevent a flow of fluid from interacting directly with the spring assembly 240. In various embodiments, the sealing wall 245 further defines springing properties, such as similarly as the spring assembly 240, to enable radial deflection of the second platform 220.

Figure 5:
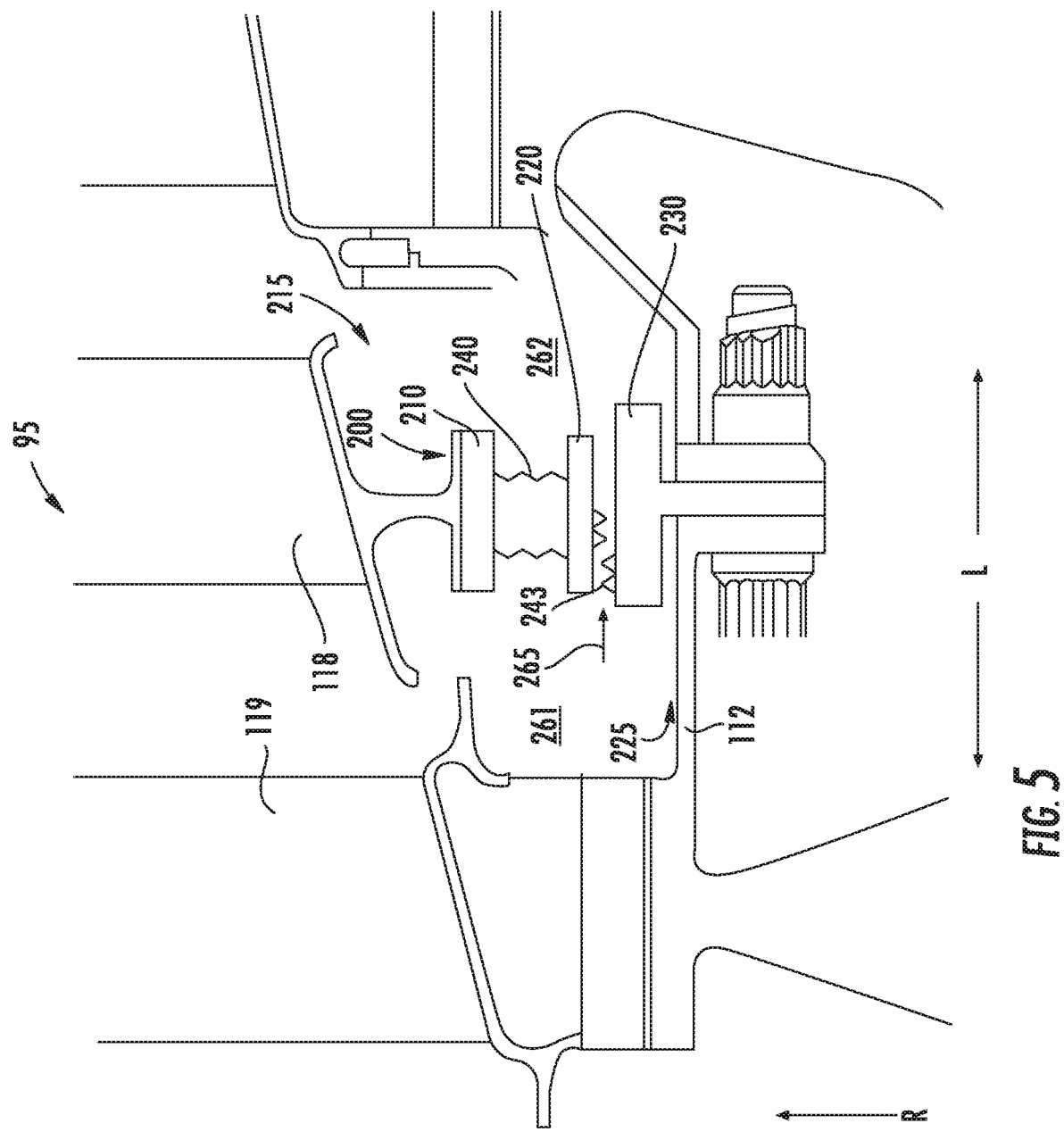
FIG. 5 is another exemplary embodiment of a rotating seal interface of the turbine rotor assembly generally provided in FIG. 2.

Referring now to FIG. 5, another embodiment of the rotating seal interface 200 is generally provided. The rotating seal interface 200 depicted in FIG. 5 may be configured substantially similarly as shown and provided in regard to FIGS. 3-4. In FIG. 5, the rotating seal interface 200 further defines one or more teeth 243 extended along the radial direction R toward the radially adjacent turbine rotor and extended along the circumferential direction relative to the axial centerline 12. The one or more teeth 243 are in adjacent arrangement along the longitudinal direction L. In one embodiment, the teeth 243 are disposed on the second platform 220 and extended generally along the radial direction R toward the third platform 230. In another embodiment, the teeth 243 are disposed on the third platform 230 and extended generally along the radial direction R toward the second platform 220.

The teeth 243 may define a higher pressure region at the first end 261 and a lower pressure region at the second end 262. In various embodiments, the teeth 243 are generally non-contacting the opposing turbine rotor. For example, the teeth 243 defined on the second platform 220 at the first turbine rotor 110 may be disposed radially toward the third platform 230 in non-contacting arrangement. As another example, the teeth 243 defined on the third platform 230 at the second turbine rotor 120 may be disposed radially toward the second platform 220 in non-contacting arrangement.

In still various embodiments, the second platform 220, the third platform 230, or both defines an abradable material at least on a diameter radially opposing the teeth 243. The abradable material may define a honeycomb structure or coating into which the teeth 243 may contact during operation of the engine 10.

Figure 6:
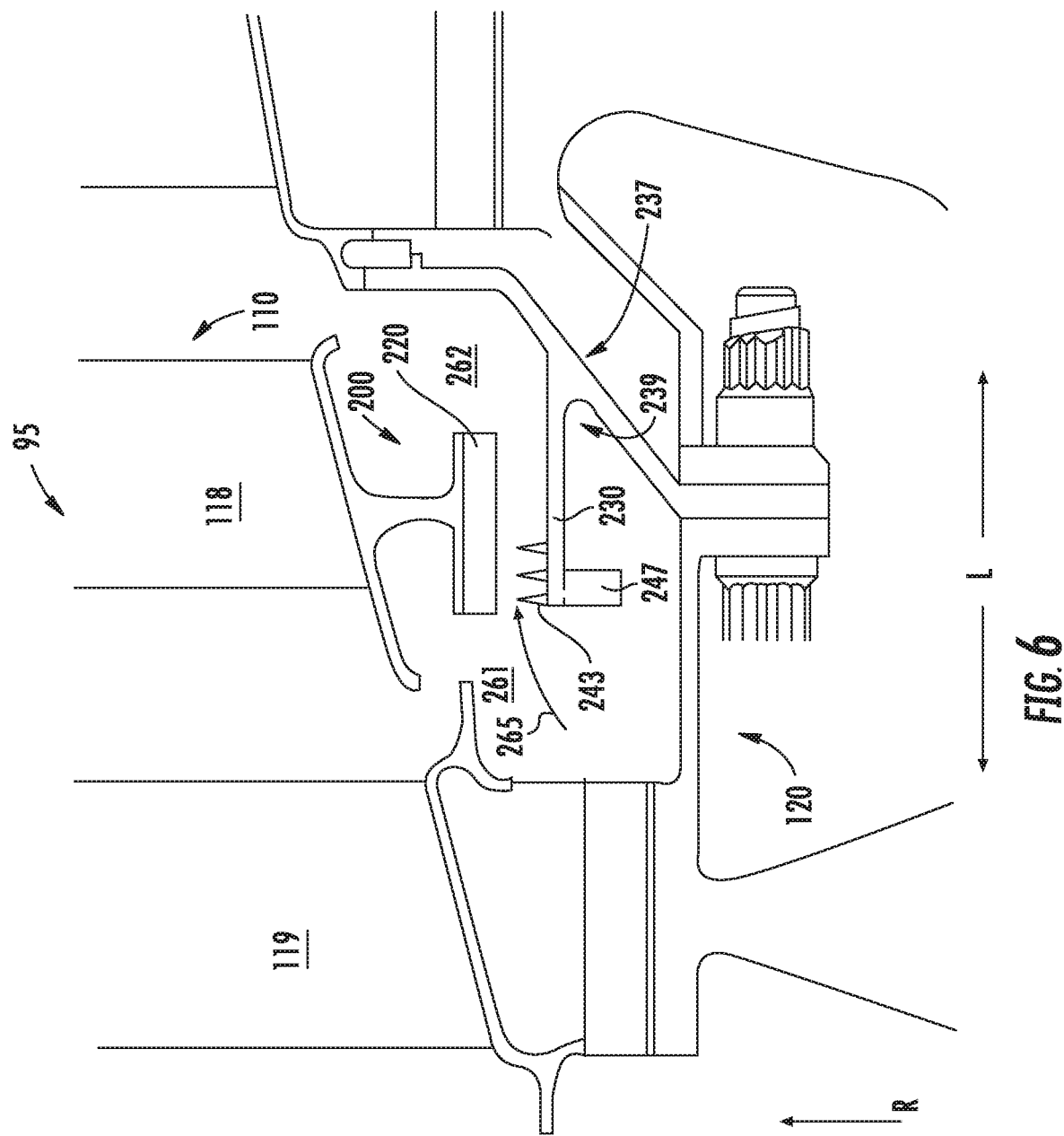
FIG. 6 is yet another exemplary embodiment of a rotating seal interface of the turbine rotor assembly generally provided in FIG. 2.

Referring now to FIG. 6, another exemplary embodiment of the rotating seal interface 200 is generally provided. In the embodiment generally depicted, the second platform 220 is coupled to the inner diameter 215 of the outer rotor airfoils 118. In other embodiments, the second platform 220 may be coupled to the outer diameter 115 of the inner rotor airfoils 119 (FIG. 2). The third platform 230 is coupled to the opposing rotor of the turbine rotor assembly 95 opposite along the radial direction R of the second platform 220. The third platform 230 defines one or more teeth 243 extended along the radial direction R toward the second platform 220 and extended along the circumferential direction relative to the axial centerline 12. The one or more teeth 243 are in adjacent arrangement along the longitudinal direction L. In various embodiments, the second platform 220 defines an abradable material at least on a diameter radially opposing the third platform 230.

In one embodiment, the third platform 230 further defines a rib 247 disposed radially inward of the teeth 243. The rib 247 defines a weight promoting deflection of the third platform 230 along the radial direction R. In various embodiments, the third platform 230 is extended along the longitudinal direction L and cantilevered from a radial portion 237 of the turbine rotor assembly 95. In one embodiment, a radius 239 is defined between the third platform 230 and the radial portion 237 of the turbine rotor assembly 95. The radius 239 promotes deflection of the third platform 230 along the radial direction R.

Referring now to FIGS. 3-6, one or more of the first platform 210, the spring assembly 240, and the second platform 220 are segmented along the circumferential direction, permitting substantially independent radial displacement of each segment relative to one another. For example, a plurality of circumferentially adjacent segments may define a generally annular layout or structure of the rotating seal interface 200. The plurality of circumferentially adjacent segments may enable relatively independent growth, movement, or displacement along the radial direction R, the circumferential direction, or both. The plurality of circumferentially adjacent segments may further enable at least partially independent movement along the longitudinal direction L.

Figure 7:
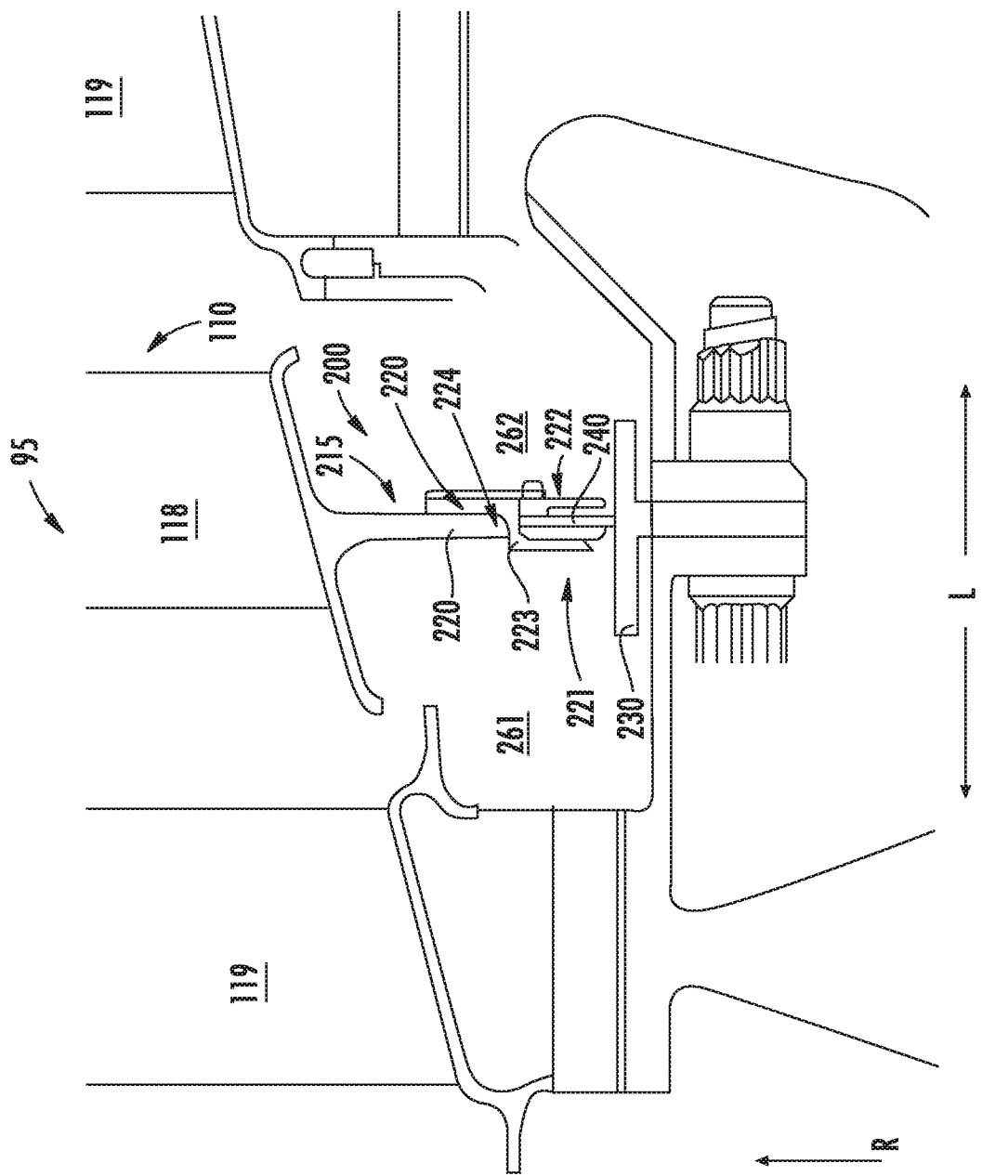
FIG. 7 is still yet another exemplary embodiment of a rotating seal interface of the turbine rotor assembly generally provided in FIG. 2.

Referring now to FIG. 7, another exemplary embodiment of the rotating seal interface 200 is generally provided. In the embodiment generally depicted, the rotating seal interface 200 defines the first platform 210 extended along the radial direction R. The second platform 220 is extended along the radial direction R and adjacent along the longitudinal direction L to the first platform 210. The longitudinally adjacent arrangement of the first platform 210 and the second platform 220 enable deflection of the first turbine rotor 110, the second turbine rotor 120, or both along the radial direction R while providing overlap along of the first platform 210 and the second platform 220 along the radial direction R, thereby mitigating leakages between the first turbine rotor 110 and the second turbine rotor 220 from the first end 261 to the second end 262.

In various embodiments, the first platform 210 is defined at the inner diameter 215 of the outer rotor airfoils 118, such as generally provided in FIG. 7. In other embodiments, the first platform 210 is defined at the outer diameter 115 of the inner rotor airfoils 119. In still other embodiments, the first platform 210 is defined at the inner diameter 125 of the outer rotor 114. The second platform 220 is defined at the opposing turbine rotor. For example, in regard to FIG. 7, the second platform 220 is defined at the outer diameter 225 of the inner rotor 112. In other embodiment, the second platform 220 is defined at the inner diameter 125 of the outer rotor 114.

In various embodiments, the second platform 220 further defines a first wall 221 and a second wall 222 extended along the radial direction R. The first wall 221 and the second wall 222 and separated along the longitudinal direction L. The spring assembly 240 is defined between the first wall 221 and the second wall 222. The spring assembly 240 permits displacement of the second platform 220 relative to the first platform 210 along the longitudinal direction L between the first turbine rotor 210 and the second turbine rotor 220.

Referring still to FIG. 7, an axial wall 223 is defined between the first wall 221 and the second wall 222 and coupled to each. A fluid passage 224 is defined between the first platform 210, the second platform 220, and the axial wall 223.

In one embodiment, the first platform 210 or the second platform 220 defines a carbon seal surface 226 adjacent along the longitudinal direction L to the opposing platform. The carbon seal surface 226 is defined circumferentially relative to the axial centerline 12 along the first platform 210 or the second platform 220.

Referring now to FIGS. 1-7, in various embodiments the outer rotor airfoils 118 define a first material defining a density of approximately 4.0 g/cm3 or less. For example, the first material defines a ceramic matrix composite (CMC) material or a titanium-based alloy. The relatively low density of the first material may reduce deflection along the radial direction R. For example, the relatively low density of the first material may mitigate deflections induced by rotation of the first turbine rotor 110, such as along the radial direction R. As such, the relatively low density first material may reduce the radial distance between the first platform 210, second platform 220, or both relative to the inner rotor 112 or third platform 230.

In still various embodiments, the outer rotor 114 defines a material thickness sufficient to mitigate deflection along the radial direction R. More specifically, at least a portion of the outer rotor 114 to which the outer rotor airfoils 118 attach, such as a hanger, pin, or mechanical fastening location, may define a material thickness sufficient to mitigate deflection induced by rotation of the outer rotor 114. In one embodiment, the outer rotor 114 may define the first material such as described in regard to the outer rotor airfoils 118.

During operation of the engine 10 as shown collectively in FIGS. 1-7, the high speed turbine rotor 120 rotates generally at a higher rotational speed than the intermediate speed turbine rotor 130. The intermediate speed turbine rotor 130 rotates generally at a higher speed than the low speed turbine rotor 110. During operation of the engine 10, a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel 91 is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14. Rotation of the first turbine rotor 110 and the second turbine rotor 120 generally induces expansion and contraction along the radial direction R relative to changes in rotational speed, loading, and one or more operating conditions, such as temperatures of the combustion gases 86, surface and internal temperatures of the outer rotor airfoils 118, the inner rotor airfoils 119, the outer rotor 114, and the inner rotor 112, and any amount of cooling fluid provided to the turbine rotor assembly 95.

Various embodiments of the rotating seal interface 200 shown and described in regard to FIGS. 3-5 may define a foil seal assembly at the first turbine rotor 110 and the second turbine rotor 120. Still various embodiments of the rotating seal interface 200 shown and described in regard to FIG. 6 may define a labyrinth seal assembly at the first turbine rotor 110 and the second turbine rotor 120. Yet various embodiments of the rotating seal interface 200 shown and described in regard to FIG. 7 may define a carbon seal assembly at the first turbine rotor 110 and the second turbine rotor 120. The various embodiments of the rotating seal interface 200 shown and described in regard to FIGS. 3-7 define platforms that may control the flow of fluid 265 from the first end 261 to the second end 262. Portions of each embodiment generally depicted in FIGS. 3-7 may be utilized, altered, or arranged among each of the embodiments shown and described in regard to FIGS. 3-7.

Still further, embodiments of the turbine rotor assembly 95 shown and described in regard to FIGS. 1-2 that mitigate deflection of one or more of the first turbine rotor 110 or the second turbine rotor 120 are further considered in conjunction with the various embodiments of the rotating seal interface 200 shown and described in regard to FIGS. 3-7. For example, the springing properties of the spring assembly 240 may be considered and configured in regard to deflection of the first turbine rotor 110 defining the first material. As another non-limiting example, the springing properties of the spring assembly 240 may be considered and configured in regard to the rib 247 defining a weight, such as a deadweight, at the third platform 230 such as to promote deflection of the third platform 230 relative to the second platform 220. Such deflection may reduce the radial distance or gap between the second platform 220 and the third platform 230, thereby reducing leakage between the first turbine rotor 110 and the second turbine rotor 120.

As yet another non-limiting example, the radius 239 at the interface of the third platform 230 and the radial portion 237 of the second turbine rotor 120 may further enable or promote deflection of the third platform 230 along the radial direction R, such as to yield benefits as described in regard to the rib 247, separately or in conjunction with the rib 247. As still yet another non-limiting example, in various embodiments in which the second platform 220, the third platform 230, or both define an abradable material, the teeth 243 may provide a yet closer or minimized radial distance or gap between the second platform 220 and the third platform 230, thereby reducing leakage of the flow of fluid 265 between the first turbine rotor 110 and the second turbine rotor 120.

Various embodiments of the turbine rotor assembly 95 including the rotating seal interfaces 200 shown and described in regard to FIGS. 1-7 enable operation of a more efficient counter-rotating interdigitated turbine rotor assembly while mitigating losses relative to flowpath leakages between the first turbine rotor 110 and the second turbine rotor 120. As such, the embodiments of the first turbine rotor 110, the second turbine 120, and the rotating seal interface 200 generally shown and described herein mitigate deleterious effects of rotating-to-rotating interfaces by providing improved sealing structures. Although the various embodiments of the rotating seal interface 200 are generally depicted in certain orientations or dispositions on the first turbine rotor 110 relative to the second turbine rotor 120, it should be appreciated that the rotating seal interfaces 200 may be re-oriented, such as along the radial direction R, the longitudinal direction L, or at an acute angle relative to the axial centerline 12, while remaining within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
    a turbine rotor assembly comprising a first turbine rotor and a second turbine rotor, wherein the first turbine rotor comprises an outer rotor and a plurality of outer rotor airfoils extended inwardly along a radial direction from the outer rotor, and wherein the second turbine rotor comprises an inner rotor and a plurality of inner rotor airfoils extended outwardly along the radial direction from the inner rotor, and further wherein the plurality of outer rotor airfoils and inner rotor airfoils are disposed in alternating arrangement along a longitudinal direction, and wherein one or more rotating seal interfaces are defined between the first turbine rotor and the second turbine rotor, wherein the one or more rotating seal interfaces comprises;
        a first platform extended at least partially along a longitudinal direction and along a circumferential direction relative to an axial centerline;
        a second platform radially spaced from the first platform, the second platform extended at least partially along a longitudinal direction and along a circumferential direction relative to an axial centerline; and
        a spring assembly coupled to the first platform, the spring assembly disposed between the first platform and the second platform, wherein the spring assembly permits displacement at least along the radial direction toward the first platform.

2. The gas turbine engine of claim 1, wherein the one or more rotating seal interfaces are defined at an outer diameter of the plurality of inner rotor airfoils and at an inner diameter of the outer rotor.

3. The gas turbine engine of claim 1, wherein the one or more rotating seal interfaces are defined at an inner diameter of the plurality of outer rotor airfoils and at an outer diameter of the inner rotor.

4. The gas turbine engine of claim 1, wherein
    the first platform is coupled to an inner diameter of the plurality of outer rotor airfoils or an outer diameter of the inner rotor
    and wherein the second platform is coupled to the spring assembly, wherein the second platform is coupled to the spring assembly radially opposite of the first platform such as to be radially inward of the first platform.

5. The gas turbine engine of claim 4, wherein the one or more rotating seal interfaces further comprise
    a third platform coupled to the outer diameter of the plurality of inner rotor airfoils or the inner diameter of the plurality of outer rotor airfoils, wherein the third platform is disposed radially adjacent to the first turbine rotor or the second turbine rotor, and further wherein the third platform is extended at least partially along the longitudinal direction and along the circumferential direction relative to the axial centerline.

6. The gas turbine engine of claim 5, wherein the one or more rotating seal interfaces further comprise one or more teeth extended along the radial direction and extended along the circumferential direction relative to the axial centerline, wherein the one or more teeth are in adjacent arrangement along the longitudinal direction.

7. The gas turbine engine of claim 6, wherein the teeth are disposed on the second platform, and wherein the teeth are extended generally along the radial direction toward the third platform.

8. The gas turbine engine of claim 7, wherein the teeth are disposed on the third platform, wherein the teeth are extended generally along the radial direction toward the second platform.

9. The gas turbine engine of claim 8, wherein the third platform further defines a rib disposed radially inward of the teeth, the rib defining a weight promoting deflection of the third platform along the radial direction.

10. The gas turbine engine of claim 5, wherein the third platform is extended along the longitudinal direction and cantilevered from a radial portion of the turbine rotor assembly.

11. The gas turbine engine of claim 10, wherein a radius is defined between the third platform and a radial portion of the turbine rotor assembly, the radius promoting deflection of the third platform along the radial direction.

12. The gas turbine engine of claim 4, wherein the one or more rotating seal interfaces define a foil seal assembly together at the first turbine rotor and the second turbine rotor.

13. The gas turbine engine of claim 4, wherein one or more of the first platform, the spring assembly, and the second platform are segmented along the circumferential direction, permitting substantially independent radial displacement of each segment relative to one another.

14. The gas turbine engine of claim 8, wherein the second platform defines an abradable material at least on a diameter radially opposing the teeth disposed on the third platform.

15. The gas turbine engine of claim 1, wherein the outer rotor airfoils define a first material defining a ceramic matrix composite material or a titanium-based alloy.

16. The gas turbine engine of claim 1, wherein the second platform comprises one or more teeth extended along the radial direction toward the first platform and extended along the circumferential direction relative to the axial centerline, wherein the one or more teeth are in adjacent arrangement along the longitudinal direction, and wherein the first platform comprises an abradable material at least on a diameter radially opposing the second platform.

17. The gas turbine engine of claim 1, wherein the first platform is positioned at an inner diameter of the outer rotor airfoils or an outer diameter of the inner rotor airfoils, and wherein the second platform is positioned at the outer diameter of the inner rotor airfoils or at the inner diameter of the outer rotor airfoils rotor opposite of the first platform.

18. The gas turbine engine of claim 17, wherein the second platform further comprises a first wall and a second wall extended along the radial direction and separated along the longitudinal direction, and wherein the spring assembly is positioned between the first wall and the second wall, and wherein the spring assembly permits displacement of the second platform relative to the first platform along the longitudinal direction between the first turbine rotor and the second turbine rotor.

19. The gas turbine engine of claim 18, wherein an axial wall is coupled to the first wall and the second wall and positioned therebetween, and wherein a fluid passage is defined between the first platform, the second platform, and the axial wall.

20. The gas turbine engine of claim 17, wherein the first platform or the second platform defines a carbon seal surface longitudinally adjacent to another of the first platform or the second platform at the first turbine rotor or the second turbine rotor, wherein the carbon seal surface is defined circumferentially along the first platform or the second platform relative to the axial centerline.

* * * * *